(12) United States Patent
Takahashi

(10) Patent No.: US 8,488,215 B2
(45) Date of Patent: Jul. 16, 2013

(54) DRIVING UNIT AND IMAGE FORMING APPARATUS USING THE SAME

(75) Inventor: Hiroki Takahashi, Osaka (JP)

(73) Assignee: Kyocera Mita Corporation (JP)

( * ) Notice: Subject to any disclaimer, the term of this patent is extended or adjusted under 35 U.S.C. 154(b) by 112 days.

(21) Appl. No.: 13/279,411

(22) Filed: Oct. 24, 2011

(65) Prior Publication Data

US 2012/0105922 A1 May 3, 2012

(30) Foreign Application Priority Data

Oct. 29, 2010 (JP) ................................ 2010-244432

(51) Int. Cl.
*H04N 1/04* (2006.01)

(52) U.S. Cl.
USPC ............ 358/474; 358/486; 358/497; 399/110

(58) Field of Classification Search
USPC .... 358/474, 498, 486, 497, 496, 501; 399/92, 399/110, 116, 117, 111
See application file for complete search history.

(56) References Cited

U.S. PATENT DOCUMENTS

| | | | |
|---|---|---|---|
| 7,567,769 B2 * | 7/2009 | Noguchi et al. | 399/110 |
| 7,715,746 B2 * | 5/2010 | Tanabe et al. | 399/90 |
| 7,813,669 B2 * | 10/2010 | Matsumoto et al. | 399/110 |
| 7,953,343 B2 * | 5/2011 | Kawamata | 399/92 |
| 7,957,670 B2 * | 6/2011 | Kondo et al. | 399/117 |
| 8,027,614 B2 * | 9/2011 | Igarashi | 399/110 |
| 8,301,054 B2 * | 10/2012 | Tanabe et al. | 399/90 |
| 8,311,448 B2 * | 11/2012 | Hashimoto | 399/110 |
| 8,406,653 B2 * | 3/2013 | Okamoto | 399/110 |
| 8,406,654 B2 * | 3/2013 | Igarashi | 399/110 |

FOREIGN PATENT DOCUMENTS

JP 11-101309 4/1999

* cited by examiner

*Primary Examiner* — Negussie Worku
(74) *Attorney, Agent, or Firm* — Gerald E. Hespos; Michael J. Porco; Matthew T. Hespos

(57) ABSTRACT

A driving unit (1) includes holders (5) rotatably supporting a shaft (2) and rotatably holding first and second helical gears (3, 4). Each holder 5 includes first and second receiving portions (9, 10). The first receiving portions (9) receive forces in a direction to push the first helical gears (3) toward backs of accommodating portions (7) by contacting parts of the first helical gears (3) when the shaft (2) and the first helical gears (3) are rotated in a certain rotational direction. The second receiving portions (10) receive forces in a direction to push the first helical gears (3) from interiors of the accommodating portions (7) to openings (8) by contacting parts of the shaft (2) when the shaft (2) and the first helical gears (3) are rotated in an opposite direction. Thus, the driving unit is assembled easily and the helical gears are held stably in both rotational directions.

4 Claims, 10 Drawing Sheets

DRIVING UNIT AND IMAGE FORMING APPARATUS USING THE SAME

BACKGROUND OF THE INVENTION

1. Field of the Invention

The present invention relates to a driving unit including a combination of a shaft and helical gears and an image forming apparatus using the same.

2. Description of the Related Art

Conventionally, an image forming apparatus such as a laser scanner includes a laser scanning unit for emitting a laser beam onto the peripheral surface of a photoconductive drum. A slit-like laser emission aperture of the laser scanning unit is normally covered by a transparent plate such as a glass plate. However, if this transparent plate is stained due to deposition of toner, image quality may be affected. Accordingly, to regularly and automatically clean the transparent plate, it has been proposed to provide the laser scanning unit with a wiping member for wiping off stains such as toner attached to the surface of the transparent plate and a driving unit for reciprocating the wiping member along a longitudinal direction of the transparent plate.

A structure for transmitting a drive force of a motor to a plurality of spur gears via a shaft and further transmitting it to the wiping member via the spur gears has been conventionally known as the driving unit for reciprocating such a wiping member.

A mechanism using helical gears in place of spur gears in such a driving unit, has been studied and developed in recent years by the inventors of the present application. The driving unit using the helical gears includes a plurality of first helical gears connected to a shaft and a plurality of second helical gears perpendicular to and engaged with the first helical gears. In this driving unit, the first helical gears rotate together with the shaft when the shaft is rotated by a motor. Further, the second helical gears perpendicular to and engaged with the first helical gears also respectively rotate. In this way, the wiping members connected to the second helical gears can be driven.

In a driving unit including normal helical gears, a drive shaft is rotated only in one direction. Thus, a thrust plate for positioning helical gears coaxially fixed to the drive shaft in an axial direction (i.e. thrust direction) supports only one surface of each helical gear.

However, in the driving unit for cleaning as described above, the shaft, the first helical gears and the second helical gears need to be driven and rotated in both forward and reverse directions to drive the wiping members for cleaning in both forward and reverse directions. When being driven and rotated in both forward and reverse directions, the first helical gears receive forces acting in directions (thrust directions) parallel to the axial direction of the second helical gears (hereinafter, referred to as thrust forces) as reaction forces from the second helical gears in both forward and reverse directions from the second helical gears.

Here, in the case of fabricating members for holding the first helical gears and the second helical gears, it is necessary to form accommodating portions which are open in either one of the thrust directions of the second helical gears in view of assemblability of the driving unit.

In such holding members with one open side, when the shaft and the helical gears are rotated in one of forward and reverse directions by the motor, a thrust force acting on the shaft and the first helical gears in a direction parallel to the thrust direction of the second helical gears can be received in the accommodating portions of the holding members. However, a thrust force acting in an opposite direction when the shaft and the helical gears are rotated in the other rotational direction is facing toward the open sides of the accommodating portions and, hence, cannot be received by the accommodating portions of the holding members. Thus, it becomes difficult to position the shaft and the first helical gears at predetermined positions.

SUMMARY OF THE INVENTION

The present invention was developed in view of the above situation and an object thereof is to provide a driving unit which is easily assembled and can stably hold helical gears even in the case of rotation in both forward and reverse directions.

To solve the above problem, the present invention is directed to a driving unit, comprising a shaft; a first helical gear coaxially connected to the shaft; a second helical gear perpendicular to and engaged with the first helical gear; a holding member for rotatably supporting the shaft and rotatably holding the first and second helical gears; and a driver for driving and rotating the shaft in both a first rotational direction and a second rotational direction opposite to the first rotational direction, wherein the holding member includes an accommodating portion which includes an opening used to insert the first helical gear and into which at least the first helical gear is inserted through the opening; a shaft insertion hole which communicates with the accommodating portion and through which the shaft is inserted; a first receiving portion for receiving a force, which is received from the second helical gear by the first helical gear and acting in a direction to push the first helical gear to the back of the accommodating portion, by coming into contact with the first helical gear or a part of the shaft when the shaft and the first helical gear are rotated in the first rotational direction; and a second receiving portion provided on the inner peripheral surface of the shaft insertion hole or inside the shaft insertion hole for receiving a force, which is received from the second helical gear by the first helical gear and acting in a direction to push the first helical gear from the interior of the accommodating portion to the opening, by coming into contact with the first helical gear or a part of the shaft when the shaft and the first helical gear are rotated in the second rotational direction.

According to this construction, the holding member for rotatably supporting the shaft and rotatably holding the first and second helical gears includes the accommodating portion into which at least the first helical gear is inserted. Thus, the driving unit can be easily assembled by inserting the first helical gear into the accommodating portion through the opening and further inserting the shaft through the shaft insertion hole to be coaxially connected to the first helical gear.

Further, the forces in two directions received by the first helical gear from the second helical gear perpendicular thereto, i.e. the force acting in the direction to push the first helical gear to the back of the accommodating portion and the force acting in the opposite direction toward the opening, can be respectively received by the first and second receiving portions when the shaft is driven and rotated in both first and second rotational directions by the driver. Thus, even if the shaft is rotated in both forward and reverse directions, there is no problem that the first helical gear moves toward the opening and the back of the accommodating portion, and the first and second helical gears can be stably held at predetermined positions.

These and other objects, features and advantages of the present invention will become more apparent upon reading the following detailed description along with the accompanying drawings.

DETAILED DESCRIPTION OF THE PREFERRED EMBODIMENTS

Hereinafter, an embodiment of the present invention is described with reference to the drawings. First, with reference to FIG. 1, the overall construction of a driving unit 1 is described.

Figure 1:
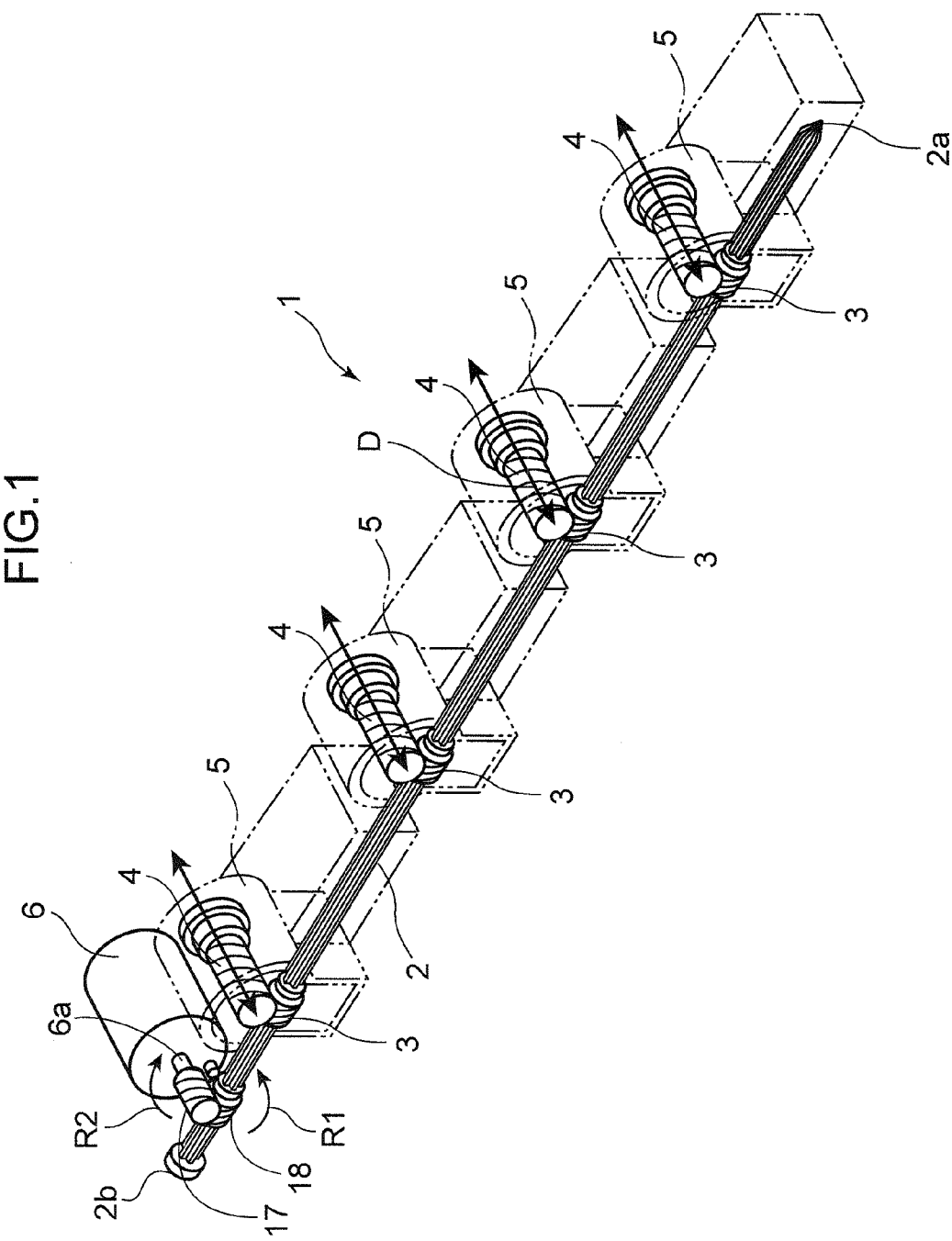
FIG. 1 is a perspective view showing the overall construction of a driving unit according to one embodiment of the invention.

The driving unit 1 shown in FIG. 1 includes a shaft 2, a plurality of first helical gears 3 connected to the shaft 2, second helical gears 4 engaged with the respective first helical gears 3, holding members 5 for holding the first and second helical gears 3, 4 and a motor 6 for driving the shaft 2.

The shaft 2 is an elongated member having a cross-shaped cross section and manufactured from a highly rigid material such as steel. Outermost side surfaces 2c (see FIG. 7) of the shaft 2 are arcuately formed as contact surfaces to be brought into contact with second receiving portions 10. The side surfaces 2c of the shaft 2 correspond to third contact surfaces of the present invention.

Figure 4:
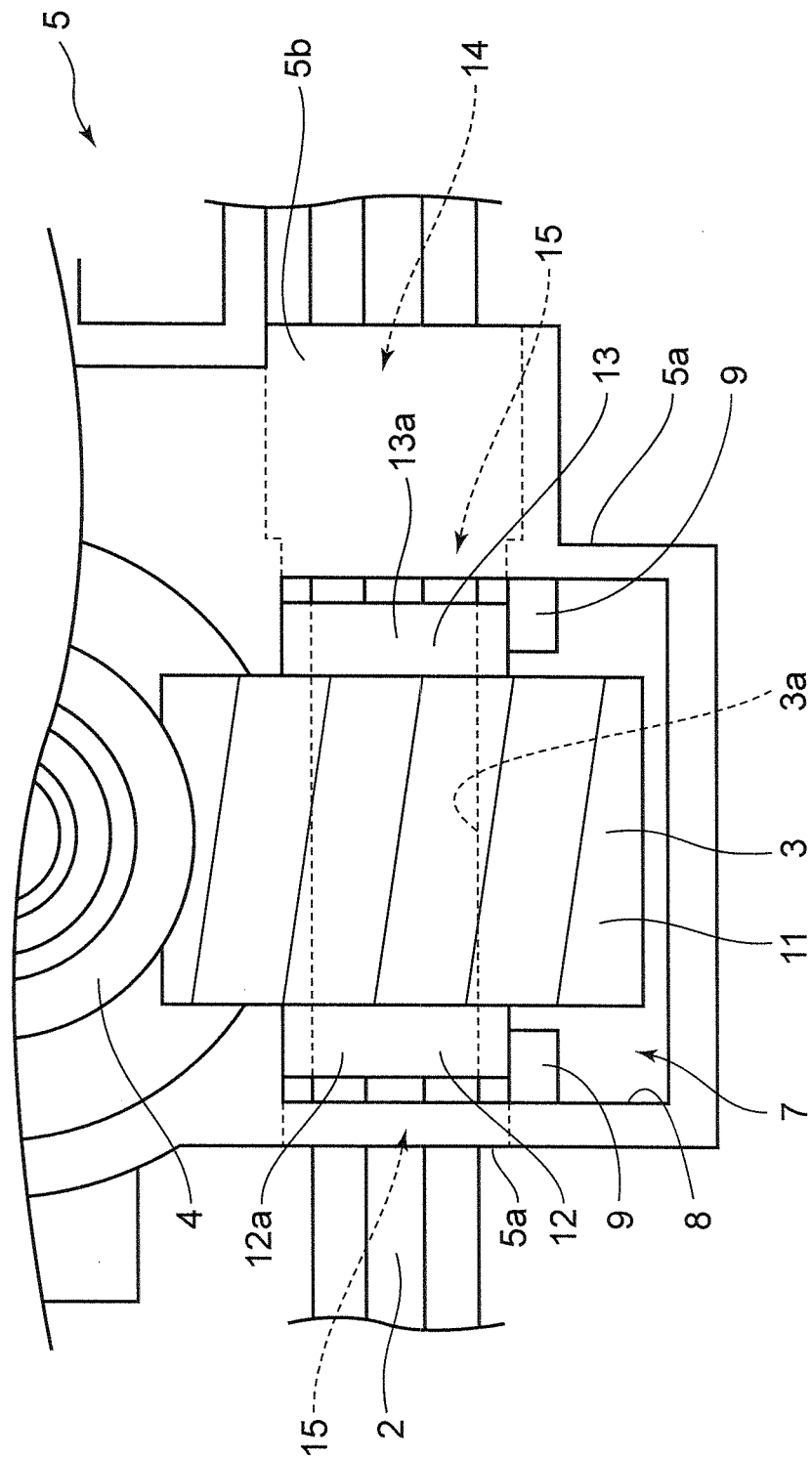
FIG. 4 is an enlarged view showing a state where the first helical gear of FIG. 2 is positioned in an accommodating portion of the holding member.

A leading end portion 2a of the shaft 2 is tapered so as to be easily insertable into a through hole 3a of each first helical gear 3 (see FIG. 4). On the other hand, a rear end portion 2b of the shaft 2 is partly radially enlarged to have a disk shape and functions as a retainer for the first helical gears 3 and the like.

Figure 2:
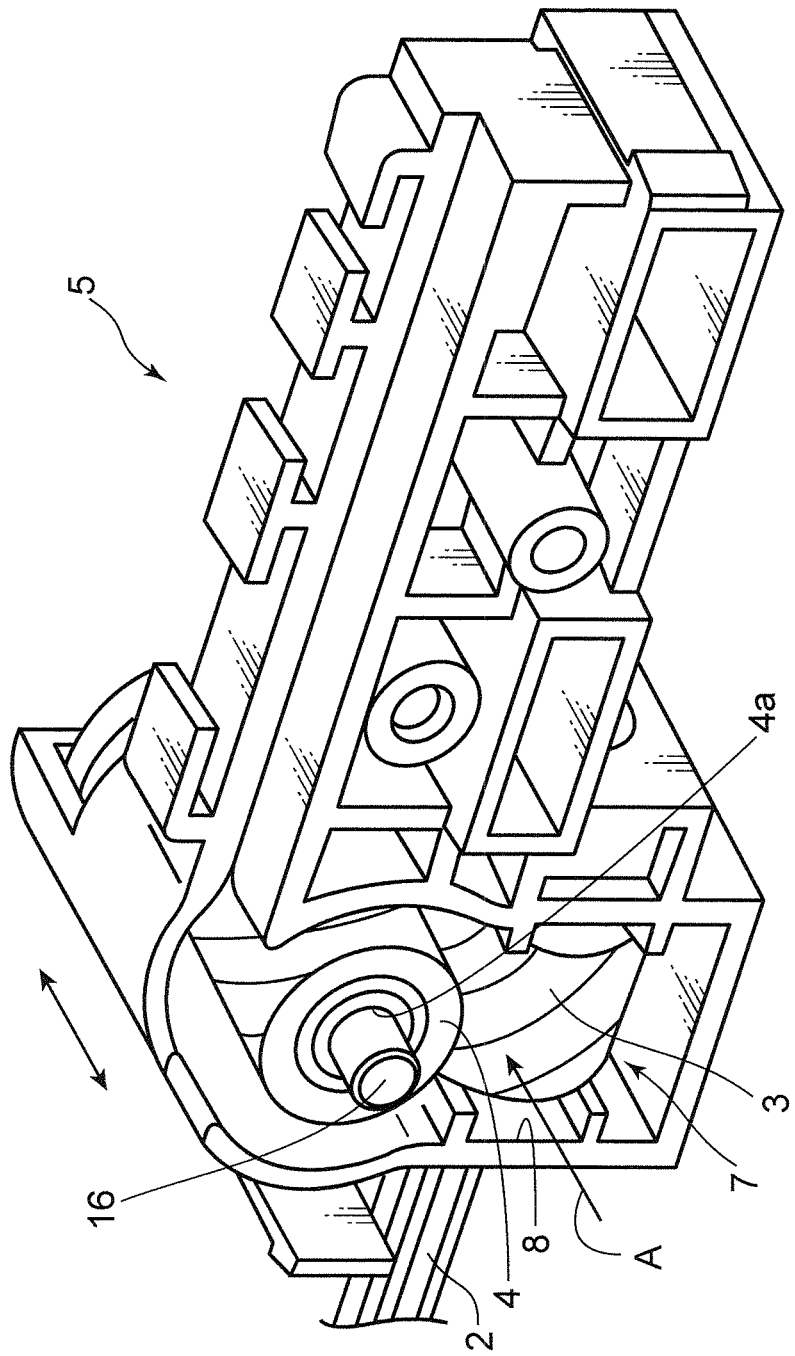
FIG. 2 is an enlarged perspective view showing a structure in which a first helical gear, a second helical gear and a shaft of FIG. 1 are held in a holding member.

As shown in FIGS. 1, 2 and 4, the first helical gears 3 are gears coaxially connected to the shaft 2 and connected at equal intervals on the shaft 2.

Each first helical gear 3 includes a gear main body 11 having teeth formed on the outer peripheral surface, and a pair of projections 12, 13 coaxially provided on opposite side surfaces of the gear main body 11. The first helical gear 3 includes the through hole 3a through which the shaft 2 having the cross-shaped cross section is inserted and which has a cross-shaped cross section to be engaged with the shaft 2. The through hole 3a is formed to penetrate through the gear main body 11 and the pair of projections 12, 13. By the engagement of the shaft 2 with the through holes 3a of the first helical gears 3, the shaft 2 and the first helical gears 3 can integrally rotate.

Further, the pair of projections 12, 13 have a cylindrical shape. Arcuate first contact surfaces 12a, 13a are respectively formed on the outer peripheral surfaces of the pair of projections 12, 13.

The second helical gears 4 are gears perpendicular to and engaged with the first helical gears 3. Each second helical gear 4 is formed with a through hole 4a along its central axis as shown in FIG. 2.

The motor 6 is for driving and rotating the shaft 2 in both forward and reverse directions. As shown in FIG. 1, a drive helical gear 17 is connected to a drive shaft 6a of the motor 6 arranged to be perpendicular to the shaft 2. This drive helical gear 17 is engaged with a driven helical gear 18 connected to the shaft 2 to transmit a rotational drive force of the motor 6 to the shaft 2.

Figure 3:
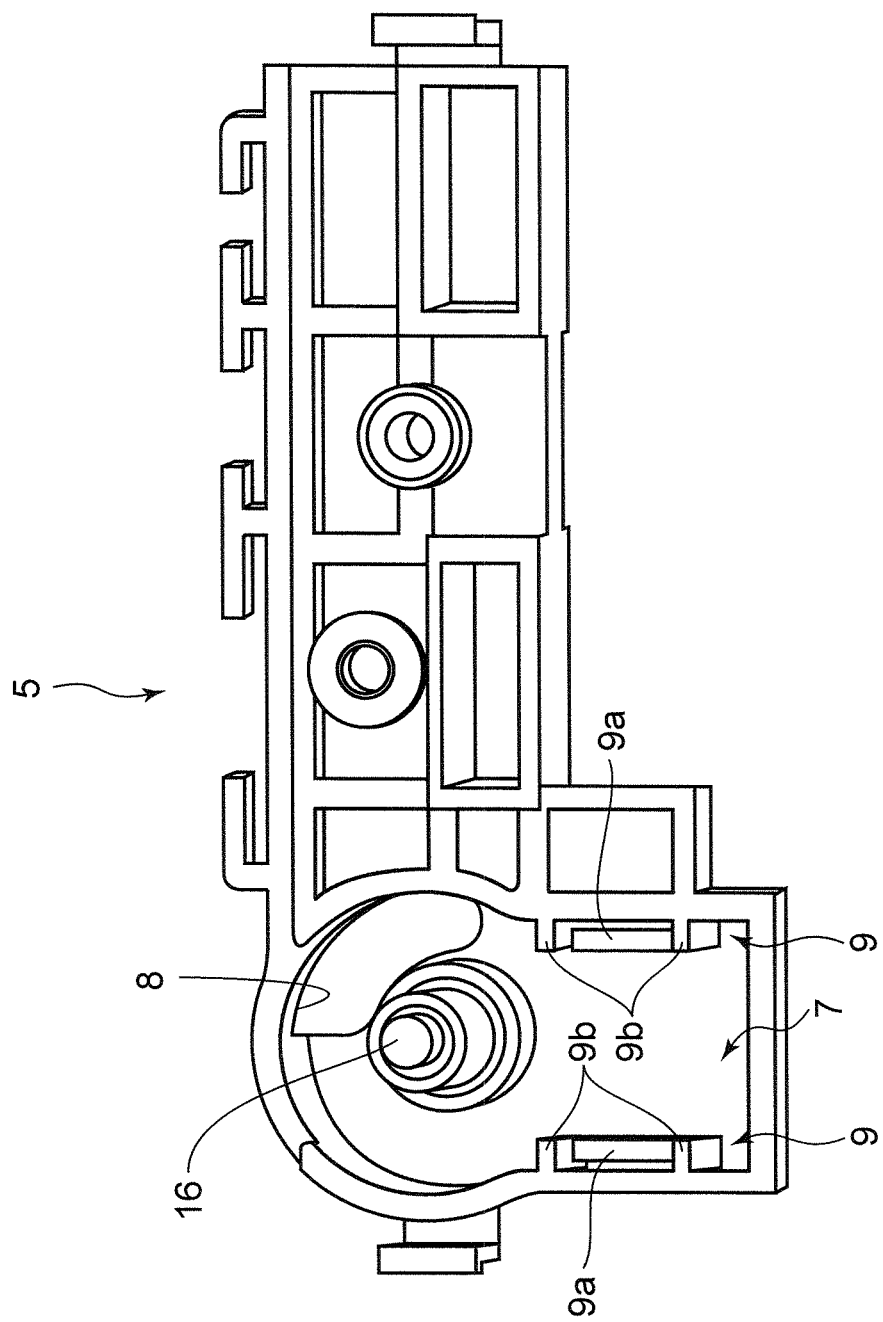
FIG. 3 is a perspective view of the holding member of FIG. 2.

As shown in FIGS. 2 to 4, the holding members 5 are cases made of resin and rotatably supporting the shaft 2 and rotatably holding the first and second helical gears 3, 4. The holding members 5 are fixed to a plate (not shown) of a main frame of an image forming apparatus by bolts or the like.

Figure 5:
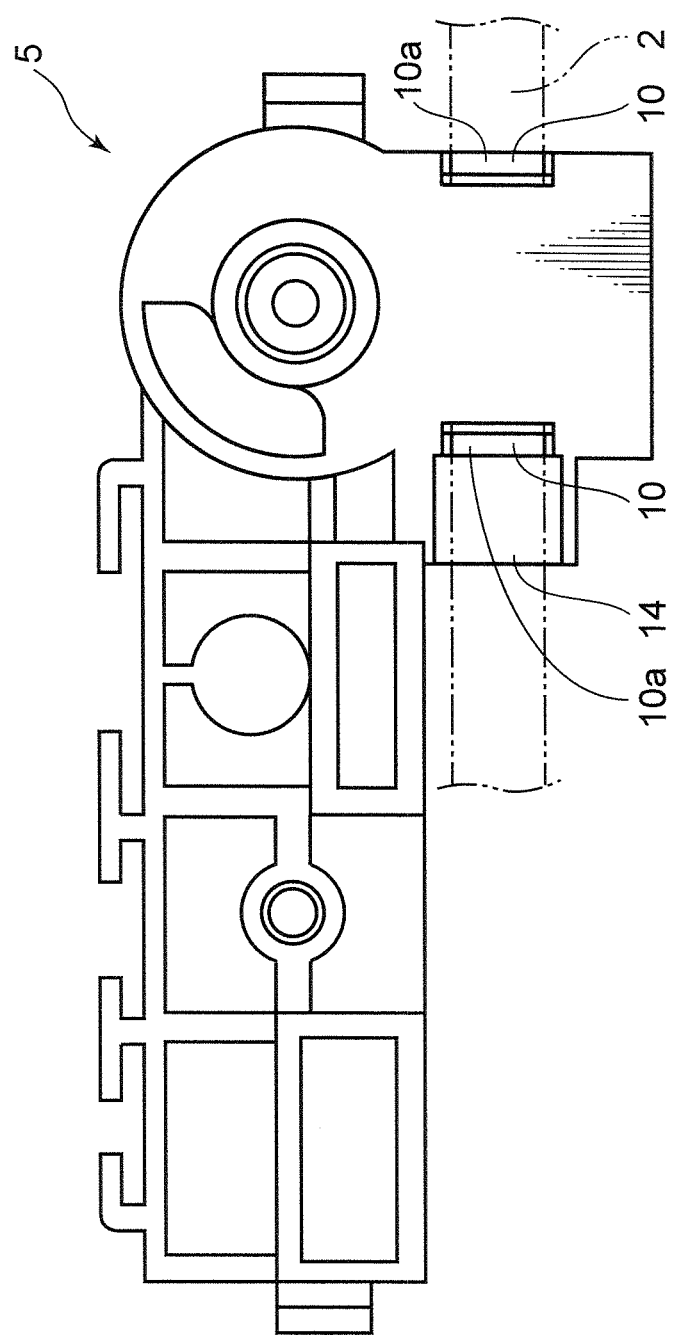
FIG. 5 is a rear view of the holding member of FIG. 2.

Each holding member 5 includes an accommodating portion 7 for accommodating the first and second helical gears 3, 4, shaft insertion holes 15, first receiving portions 9 for receiving a thrust force F1 (see FIG. 6) acting toward the back of the accommodating portion 7 and the second receiving portions 10 (see FIGS. 5 to 7) for receiving a thrust force F2 (see FIG. 6) acting toward an opening 8 of the accommodating portion 7.

The accommodating portion 7 is a space portion which has the opening 8 at its front side and into which the first and second helical gears 3, 4 can be inserted through the opening 8 in a direction of an arrow A from the front side of the holding member 5.

As shown in FIG. 4, the shaft insertion holes 15 are formed in side walls 5a at the opposite sides of the accommodating portion 7 of the holding member 5 and respectively communicate with the accommodating portion 7. The shaft 2 is inserted into the accommodating portion 7 through these shaft insertion holes 15.

As shown in FIGS. 3 and 4, the first receiving portions 9 are respectively formed near the shaft insertion holes 15 at the opposite sides in the accommodating portion 7. The first receiving portions 9 are open toward the opening 8 at the front side of the accommodating portion 7. The first receiving portions have arcuate second contact surfaces 9a on their inner peripheral surfaces and include guiding portions 9b for guiding the first and second projections 12, 13 of the first helical gear 3 to the second contact surfaces 9a through the opening 8 of the accommodating portion 7.

At the first receiving portions 9, the first contact surfaces 12a, 13a forming the outer peripheral surfaces of the pair of projections 12, 13 of the first helical gear 3 and the arcuate second contact surfaces 9a are held in contact, whereby the thrust force F1 (see FIG. 6) that is received from the second helical gear 4 by the first helical gear 3 and acting in a direction to push the first helical gear 3 to the back of the accommodating portion 7 can be received by the second contact surfaces 9a.

As shown in FIGS. 4 to 7, the second receiving portions 10 slightly project into the shaft insertion holes 15 at the side walls 5a at the opposite sides of the accommodating portion 7. The second receiving portions 10 are open toward the rear side (right side in FIG. 6) of the accommodating portion 7. The second receiving portions 10 have arcuate fourth contact surfaces 10a on their inner peripheral surfaces.

At the second receiving portions 10, the arcuate side surfaces 2c (third contact surfaces) of the shaft 2 and arcuate fourth contact surfaces 10a of the second receiving portions 10 are in contact, whereby the thrust force F2 (see FIG. 6) that is received from the second helical gear 4 by the first helical gear and acting in the direction to push the first helical gear 3 from the interior of the accommodating portion 7 to the opening 8 is received by the fourth contact surfaces 10a.

Figure 6:
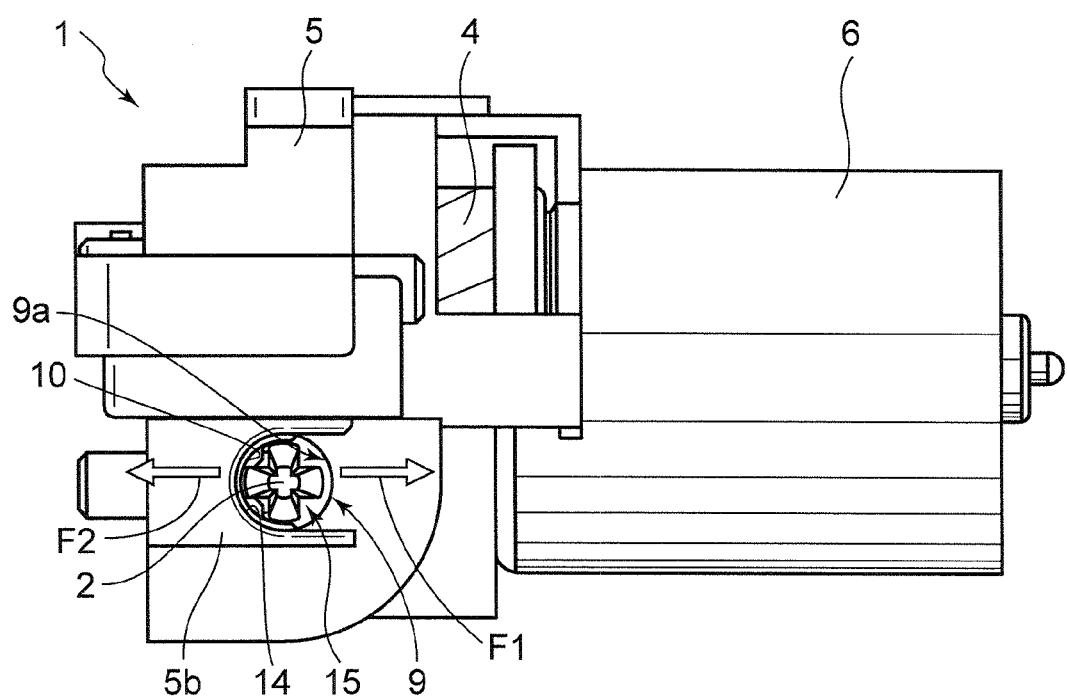
FIG. 6 is a side view showing thrust forces produced in forward and backward directions when the shaft is driven and rotated in a first rotational direction and a second rotational direction in the driving unit of FIG. 1.
Figure 7:
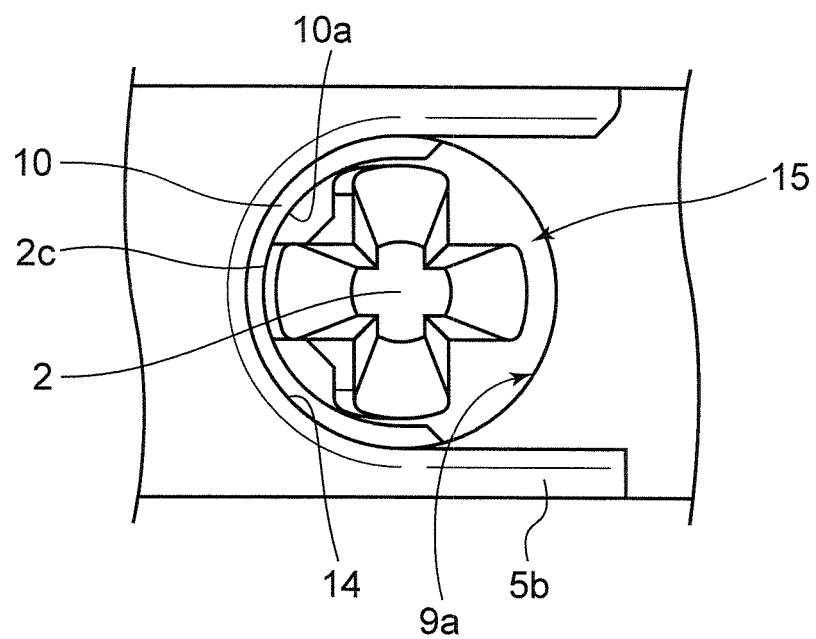
FIG. 7 is an enlarged view showing the vicinity of the shaft and a second receiving portion of FIG. 6.

Further, as shown in FIGS. 4, 6 and 7, a projecting portion 5b is formed on one 5a of the opposite side walls 5a of the holding member 5. A recess 14 which is open backward is formed on the rear side (on the right side in FIG. 6) of the projecting portion 5b. The shaft 2 passes through the interior of the recess 14.

In the case of assembling the driving unit of this embodiment, the first and second helical gears 3, 4 are first accommodated into the accommodating portions 7 through the openings 8 at the front sides of the holding members 5 as shown in FIGS. 2 to 4.

Each first helical gear 3 has the pair of projections 12, 13 thereof supported by the first receiving portions 9 in the accommodating portion 7 of the holding member 5, thereby being rotatably held. Further, each second helical gear 4 is rotatably held on a support shaft 16 extending in forward and backward directions in the accommodating portion 7. At this time, the first and second helical gears 3, 4 can rotate while being perpendicular to and engaged with each other.

Thereafter, the shaft 2 is inserted through the shaft insertion holes 15 on the opposite sides of the holding members 5 and also through the through holes 3a of the first helical gears 3 accommodated in the accommodating portions 7. In this way, the shaft 2 can be coaxially connected to the first helical gears 3 and the shaft 2 itself can be rotatably connected to the holding members 5.

In a used state of the driving unit 1, as shown in FIGS. 1, 6 and 7, the thrust force F1 acting in the direction to push the first helical gears 3 toward the backs of the accommodating portions 7 (rightward force in FIG. 6) is produced when the shaft 2 and the first helical gears 3 are rotated in a first rotational direction R1 by driving the motor 6. Then, the second contact surfaces 9a (see FIG. 3) of the first receiving portions 9 of the holding members 5 and the arcuate first contact surfaces 12a, 13a (see FIG. 4) of the pairs of projections 12, 13 of the first helical gears 3 come into contact, whereby the thrust force F1 acting toward the backs of the accommodating portions 7 can be received by the first receiving portions 9. Thus, the first and second helical gears 3, 4 can be accurately positioned.

On the other hand, when the shaft 2 and the first helical gears 3 are rotated in a second rotational direction R2 opposite to the first rotational direction R1, the thrust force F2 acting in the direction to push the first helical gears 3 toward the openings 8 of the accommodating portions 7 (leftward force in FIG. 6) is produced. Then, the fourth contact surfaces 10a (see FIGS. 5 and 7) of the second receiving portions 10 of the holding members 5 and the side surfaces 2c (third contact surfaces) of the shaft 2 come into contact, whereby the thrust force F2 acting toward the openings 8 of the accommodating portions 7 can be received by the second receiving portions 10. Thus, the first helical gears 3 and the shaft 2 are not displaced toward the openings 8 of the accommodating portions 7 and the first and second helical gears 3, 4 can be accurately positioned.

Next, an image forming apparatus 101 including the driving unit 1 of this embodiment is described.

Figure 8:
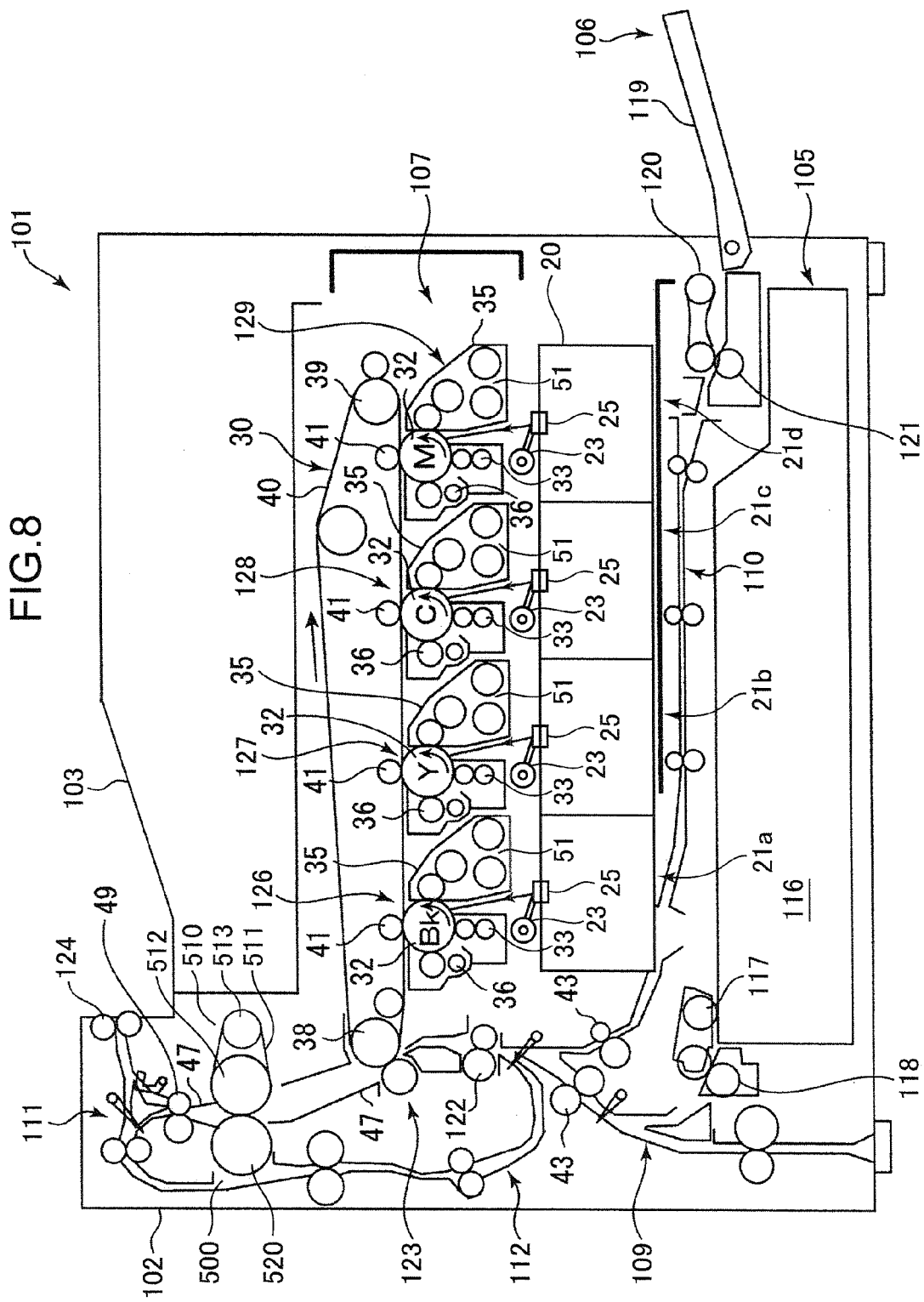
FIG. 8 is a view showing a schematic construction of an image forming apparatus, to which the driving unit of FIG. 1 is applied.

FIG. 8 is a schematic diagram showing the construction of the image forming apparatus 101 including the driving unit 1 constructed as described above. The image forming apparatus 101 shown in FIG. 8 is a tandem color printer. Note that a principle according to this embodiment may also be applied to a printer, a copier, a facsimile machine, a complex machine provided with these functions, or another apparatus for transferring and printing a toner image on a print medium based on image information input from the outside.

The image forming apparatus 101 includes a housing 102 in the form of a rectangular box. A color image is formed on a sheet in the housing 102. A sheet discharge portion 103 is provided on an upper surface portion of the housing 102. A sheet having a color image printed thereon is discharged onto the sheet discharge portion 103. The sheet may be, for example, a copy sheet, a postcard, an OHP sheet, a tracing paper or another print medium on which a toner image can be formed.

The housing 102 houses a sheet cassette 105 for supplying sheets and an image forming station 107. Further, a stack tray 106 used to manually feed a sheet is attached to the housing 102. The stack tray 106 is arranged above the sheet cassette 105. The image forming station 107 arranged above the stack tray 106 forms an image on a sheet based on image data such as characters and pictures transmitted from the outside of the image forming apparatus 101.

A first conveyance path 109 is formed at a left part of the housing 102 shown in FIG. 8. A sheet fed from the sheet cassette 105 is conveyed to the image forming station 107 through the first conveyance path 109. A second conveyance path 110 is formed above the sheet cassette 105. A sheet fed from the stack tray 106 moves from the right side to the left side of the housing 102 through the second conveyance path 110 and arrives at the image forming station 107. A fixing unit 500 for performing a fixing process on a sheet having an image forming process performed thereon by the image forming station 107 and a third conveyance path 111 for conveying the sheet after the fixing process to the sheet discharge portion 103 are provided in a left upper part in the housing 102.

The sheet cassette 105 is formed to be withdrawable to the outside (e.g. right side of FIG. 8) of the housing 102. A user can pull out the sheet cassette 105 and replenish it with sheets. The sheet cassette 105 includes a storage portion 116. The user can selectively store sheets of various sizes in the storage portion 116. The sheets stored in the storage portion 116 are fed one by one toward the first conveyance path 109 by a feed roller 117 and separation rollers 118.

The stack tray 106 is formed to be vertically rotatable between a closed position where it extends along an outer surface of the housing 102 and an open position (shown in FIG. 8) where it projects from the outer surface of the housing 102. Sheets are placed one by one on a manual feed portion 119 of the stack tray 106. Alternatively, the user may place a plurality of sheets on the manual feed portion 119. The sheets placed on the manual feed portion 119 are fed one by one toward the second conveyance path 110 by a pickup roller 120 and separation rollers 121.

The first and second conveyance paths 109, 110 join before registration rollers 122. A sheet having reached the registration rollers 122 is caused to temporarily stop by the registration rollers 122. The registration rollers 122 then perform a skew adjustment and a timing adjustment on the sheet. After the skew adjustment and the timing adjustment, the registration rollers 122 send the sheet toward a secondary transfer portion 123. A full-color toner image on an intermediate transfer belt 40 is secondarily transferred to the sheet sent to the secondary transfer portion 123. After the secondary transfer, the sheet is sent to the fixing unit 500. The fixing unit 500 fixes the toner image to the sheet. If necessary, the secondary transfer portion 123 forms a new full-color toner image on the other side of the sheet after the toner image is fixed to one side of the sheet (duplex printing). In the case of duplex printing, a sheet is sent to a fourth conveyance path 112 to be reversed after a toner image is fixed to one side of the sheet. A new toner image formed on the other side by the secondary transfer portion 123 is fixed by the fixing unit 500. Thereafter, the sheet passes through the third conveyance path 111 and is discharged to the sheet discharge portion 103 by discharge rollers 124.

The image forming station 107 includes four image forming units 126 to 129 for forming respective toner images of black (Bk), yellow (Y), cyan (C) and magenta (M). The image forming station 107 further includes an intermediate transfer portion 30. The intermediate transfer portion 30 bears toner images formed by these image forming units 126 to 129 in a composite manner.

Each of the image forming units 126 to 129 includes a photoconductive drum 32 and a charger 33 arranged to face the peripheral surface of the photoconductive drum 32. The respective image forming units 126 to 129 include laser scanning units 21a to 21d for emitting laser beams to the peripheral surfaces of the respective photoconductive drums 32 based on image data such as characters and pictures transmitted from the outside of the image forming apparatus 101.

Figure 9:
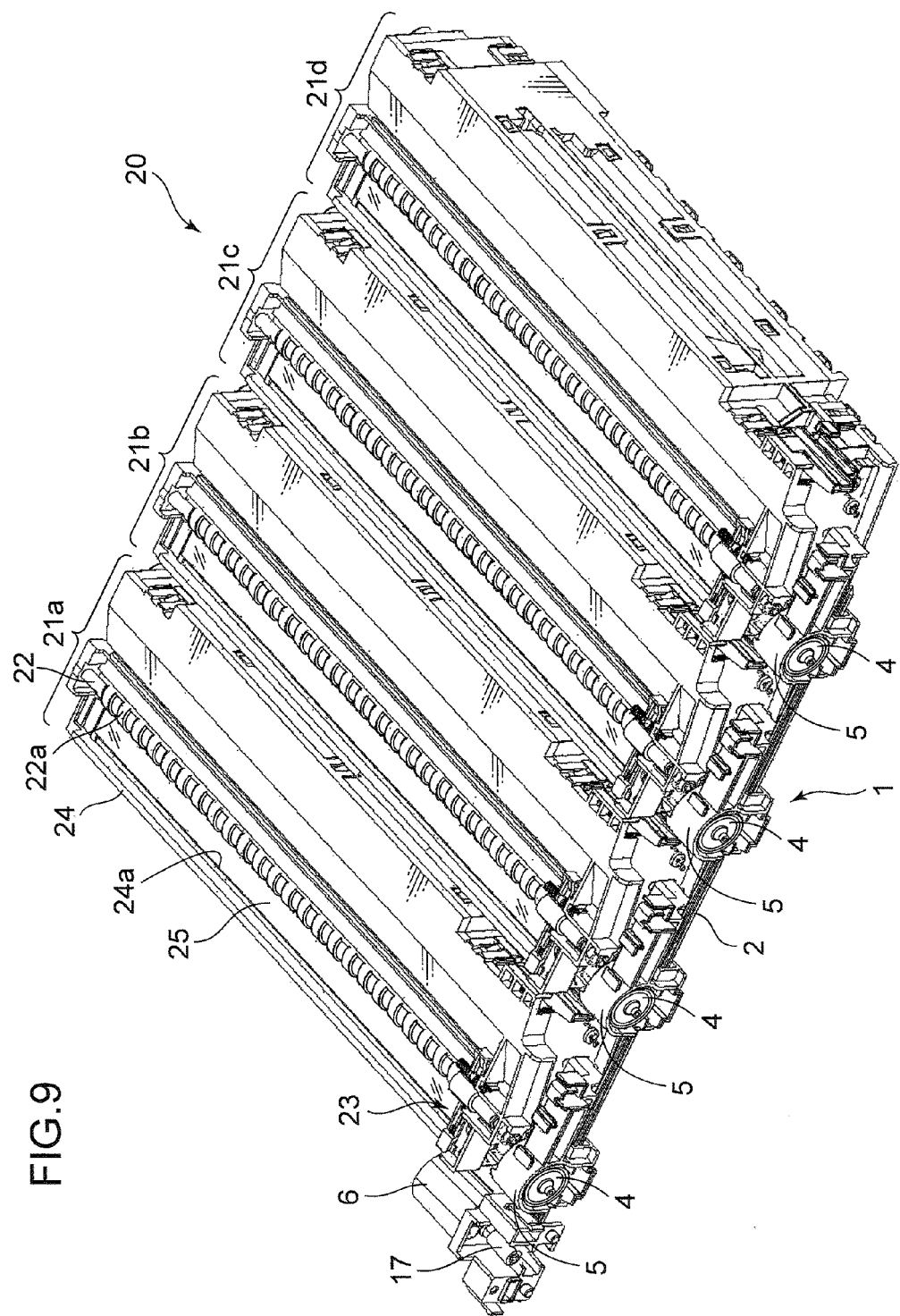
FIG. 9 is an enlarged perspective view of laser scanning units of FIG. 8.

As shown in FIGS. 8 and 9, the laser scanning units 21a to 21d are units for emitting laser beams to the peripheral surfaces of the respective photoconductive drums 32 of the four image forming units 126 to 129 for respectively forming toner images of black (Bk), yellow (Y), cyan (C) and magenta (M) and integrally combined with the driving unit 1 of the above embodiment by an unillustrated frame or the like, thereby constructing one laser scanning assembly 20.

Each of these laser scanning units 21a to 21d includes a casing 24 with an emission aperture 24a from which a laser beam is emitted, and a transparent glass plate 25 as a transmission member which covers the emission aperture 24a and has a laser transmission property. Although not shown, a laser light source for generating a laser beam, a polygon lens for changing a direction of the laser beam and the like are housed in the casing 24. The emission aperture 24a has a slit-like long and narrow shape. Further, the transparent glass plate 25 also has a long and narrow shape corresponding to the emission aperture 24a.

Each of the laser scanning units 21a to 21d includes a screw shaft 22 and a wiping member (so-called wiper) 23. Output-side members of the driving unit 1, i.e. the first helical gears 3, the second helical gears 4 and the holding members 5 holding these gears 3 and 4 are respectively so arranged as to correspond to these laser scanning units 21a to 21d.

The screw shaft 22 is coaxially connected to the corresponding second helical gear 4 of the driving unit 1. An external thread 22a is formed on the outer peripheral surface of the screw shaft 22. The screw shaft 22 extends in parallel to the emission aperture 24a and the transparent glass plate 25.

Figure 10:
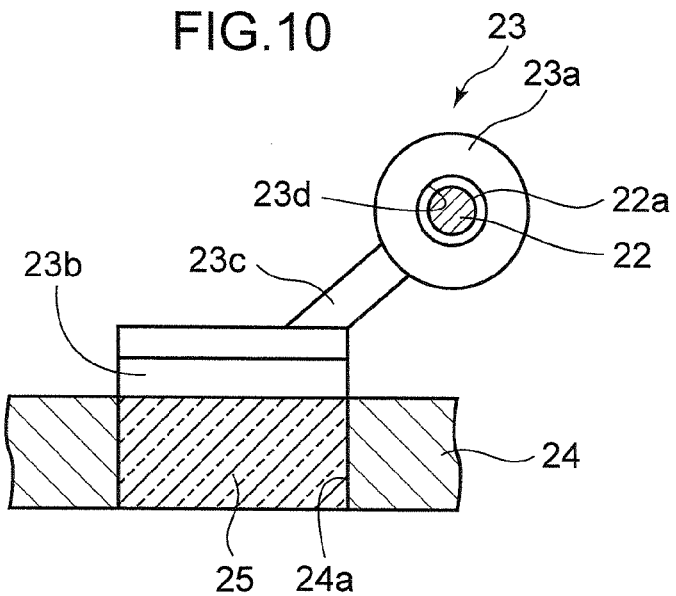
FIG. 10 is a view of a screw shaft and a wiping member of FIG. 9 when viewed in an extension direction of the screw shaft.
Figure 11:
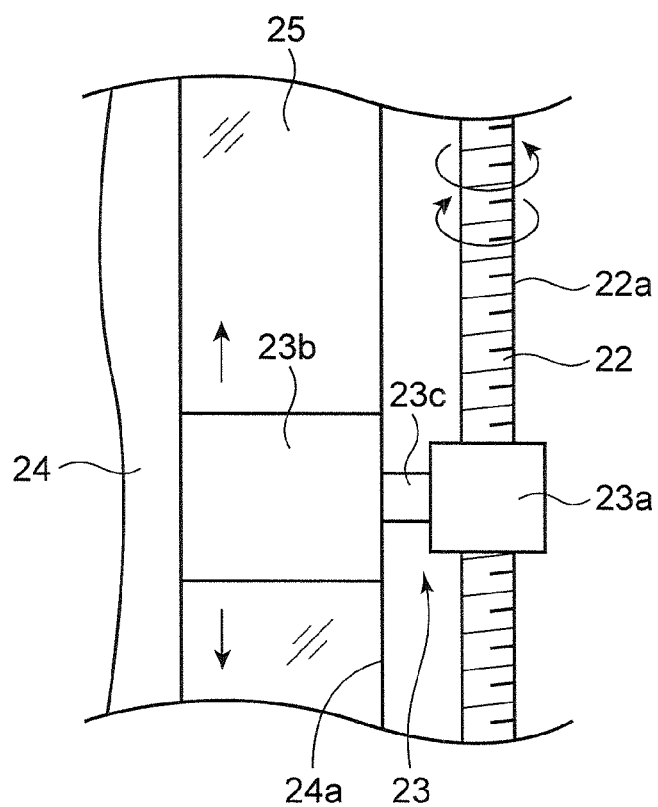
FIG. 11 is a view of the screw shaft and the wiping member of FIG. 9 when viewed from above.

As shown in FIGS. 10 and 11, the wiping member 23 includes a tubular portion 23a, a contact portion 23b and a coupling portion 23c. The tubular portion 23a has a cylindrical shape and an internal thread 23d engaged with the external thread 22a of the screw shaft 22 is formed on the inner peripheral surface thereof. The contact portion 23b moves in contact with a surface of the transparent glass plate 25 to wipe off attached matters such as toner attached to the surface of the transparent glass plate 25. At least a part of the contact portion 23b held in contact with the transparent glass plate 25 is made of a material having a high performance in wiping off fine particles such as toner, e.g. rubber or synthetic resin. The tubular portion 23a and the contact portion 23b are coupled by the coupling portion 23c.

Accordingly, when the screw shaft 22 rotates in either forward or reverse direction together with the second helical gear 4, the tubular portion 23a engaged with the screw shaft 22 receives a linear drive force from the screw shaft 22. This causes the wiping member 23 to move along the surface of the transparent glass plate 25. At this time, the contact portion 23b wipes off attached matters such as toner attached to the surface of the transparent glass plate 25 by moving them to the outside of the opposite longitudinal ends of the transparent glass plate 25. In this way, the attached matters can be wiped off from the transparent glass plate 25.

Such a wiping operation by a wiping member 23 is performed, for example, during an initial movement of the image forming apparatus 101 or regularly at a specified time interval. Further, the wiping member 23 stands by at a position retracted from the emission aperture 24a in a horizontal direction so as not to overlap the emission aperture 24a when being not in the wiping operation.

Since the transparent glass plates 25 of the laser scanning units 21a to 21d are arranged below the photoconductive drums 32 in the structure of the image forming apparatus 101 of this embodiment, toners falling from the photoconductive drums 32 may attach to the transparent glass plates 25. However, in this embodiment, by reciprocating the wiping members 23 along the longitudinal directions of the transparent glass plates 25, attached matters such as toners attached to the surfaces of the transparent glass plates 25 can be quickly and cleanly wiped off by the rubber-made contact portions 23b of the wiping member 23, wherefore image quality can be maintained even if the image forming apparatus is used for a long time.

Laser beams emitted from the laser scanning units 21a to 21d are irradiated to the peripheral surfaces of the photoconductive drums 32 downstream of the chargers 33 as shown in FIG. 8. Each of the image forming units 126 to 129 further includes a developing device 35 arranged to face the peripheral surface of the photoconductive drum 32. The developing device 35 supplies toner to the peripheral surface of the photoconductive drum 32 bearing an electrostatic latent image formed by irradiation of a laser beam to form a toner image. The toner image formed on the peripheral surface of the photoconductive drum is transferred to the intermediate transfer unit 30 (primary transfer). Each of the image forming units 126 to 129 further includes a cleaner 36 arranged to face the peripheral surface of the photoconductive drum 32. The cleaner 36 cleans the peripheral surface of the photoconductive drum 32 after the primary transfer.

The photoconductive drum 32 of each of the image forming units 126 to 129 is rotated in a counterclockwise direction by a drive motor (not shown). Black toner, yellow toner, cyan toner and magenta toner are respectively stored in toner boxes 51 of the developing devices 35 of the respective image forming units 126 to 129.

The intermediate transfer unit 30 includes a rear roller (drive roller) 38 arranged at a position near the image forming unit 126, a front roller (driven roller) 39 arranged at a position near the image forming unit 129 and the intermediate transfer belt 40 extending between the rear roller 38 and the front roller 39. The intermediate transfer unit 30 further includes four transfer rollers 41 for pressing the intermediate transfer belt 40 against the photoconductive drums 32 of the respective image forming units 126 to 129. Each transfer roller 41 presses the intermediate transfer belt 40 against the peripheral surface of the photoconductive drum 32 bearing a toner image formed by the developing device 35, thereby achieving the transfer (primary transfer) of the toner image to the intermediate transfer belt 40.

As a result of the transfer of the toner images to the intermediate transfer belt 40, toner images formed by the black toner, the yellow toner, the cyan toner and the magenta toner are superimposed on the intermediate transfer belt 40 to form a full-color toner image.

The first conveyance path 109 extends toward the intermediate transfer unit 30. A sheet fed from the sheet cassette 105 reaches the intermediate transfer unit 30 through the first conveyance path 109. A plurality of conveyor rollers 43 for conveying the sheet are appropriately arranged along the first conveyance path 109. The registration rollers 122 arranged downstream of the intermediate transfer unit 30 adjust a feed timing of the sheet passing through the first conveyance path 109 in synchronization with an image forming operation of the image forming station 107.

The fixing unit 500 heats and presses the sheet. As a result, the unfixed toner image formed on the sheet after the secondary transfer is fixed to the sheet. The fixing unit 500 includes a belt unit 510 with a belt 511 to be pressed into contact with the sheet, and a reference roller 520 for sandwiching the sheet in cooperation with the belt 511. The belt unit 510 includes a first roller 512 and a second roller 513 on which the belt 511 is mounted.

Conveyor rollers 49 are arranged downstream of the fixing unit 500. A conveyance path 47 extending from the secondary transfer portion 123 to the conveyor rollers 49 is formed in the housing 102. The sheet conveyed through the intermediate transfer unit 30 is introduced to a nip portion formed between the reference roller 520 and the belt 511 through the conveyance path 47. At the nip portion, the toner image is fixed to the sheet. The sheet having passed between the reference roller 520 and the belt 511 is then guided to the third conveyance path 111 through the conveyance path 47.

The conveyor rollers 49 send the sheet to the third conveyance path 111. The third conveyance path 111 guides the sheet having the fixing process performed thereon in the fixing unit 500 to the sheet discharge portion 103. Further, the discharge rollers 124 arranged at the exit of the third conveyance path 111 discharge the sheet to the sheet discharge portion 103.

As described above, in the driving unit 1 of this embodiment, the holding members 5 for rotatably supporting the shaft 2 and rotatably holding the first and second helical gears 3, 4 include the accommodating portions 7 into which the first and second helical gears 3, 4 are insertable. Thus, the driving unit can be easily assembled by inserting the first and second helical gears 3, 4 into the accommodating portions 7 through the openings 8 and further inserting the shaft 2 through the shaft insertion holes 15 to be coaxially connected to the first helical gears 3.

In addition, when the shaft 2 is driven and rotated in both forward and reverse directions by the motor 6, the thrust force F1 received by the first helical gears 3 from the second helical gears 4 perpendicular thereto and acting in the direction to push the first helical gears 3 to the backs of the accommodating portions 7 can be received by the first receiving portions 9 and, on the other hand, the thrust force F2 acting in the direction toward the openings 8 of the accommodating portions 7 opposite to the acting direction of the thrust force F1 can be received by the second receiving portions 10. Thus, even if the shaft 2 is rotated in both forward and reverse directions R1, R2, there is no problem that the first helical gears 3 move toward the openings 8 and the backs of the accommodating portions 7, and the first and second helical gears 3, 4 can be stably held at predetermined positions.

Further, in the driving unit 1 of this embodiment, the pairs of projections 12, 13 provided on the opposite side surfaces of the gear main bodies 11 of the first helical gears 3 come into contact with the first receiving portions 9 of the holding members 5, whereby the force F1 acting in the direction to push the first helical gears 3 to the backs of the accommodating portions 7 can be received by the first receiving portions 9. The pairs of the projections 12, 13 include the arcuate first contact surfaces 12a, 13a and the first receiving portions 9 include the corresponding arcuate second contact surfaces 9a. These first contact surfaces 12a, 13a and second contact surfaces 9a can come into contact with each other. Thus, the force F1 acting in the direction to push the first helical gears 3 to the backs of the accommodating portions 7 can be received in large contact areas by the first receiving portions 9 without the rotation of the first helical gears 3 being restricted.

Further, since the pair of projections 12, 13 of each first helical gear 3 are guided to the second contact surfaces 9a through the opening 8 of the accommodating portion 7 by the guiding portions 9b of the first receiving portions 9, the first contact surfaces 12a, 13a of the pair of projections 12, 13 can be reliably brought into contact with the second contact surfaces 9a.

Further, in the driving unit 1 of this embodiment, the side surfaces 2c (third contact surfaces) of the shaft 2 and the fourth contact surfaces 10a of the second receiving portions 10 are both arcuate. These side surfaces 2c (third contact surfaces) and fourth contact surfaces 10a can come into contact with each other. Thus, the force F2 acting in the direction to push the first helical gears 3 from the interiors of the accommodating portions 7 to the openings 8 can be received in large contact areas by the second receiving portions 10 held in contact with the side surfaces 2c of the shaft 2 without the rotation of the shaft 2 being restricted.

Further, in this image forming apparatus 101, by rotating the screw shafts 22 coaxially connected to the second helical gears 4 of the driving unit 1 as described above in both forward and reverse directions, the wiping members 23 can be linearly moved back and forth, whereby attached matters such as toners attached to the surfaces of the transparent glass plates 25 covering the emission apertures 24a of the laser scanning units 21a to 21d can be wiped off. Since the image forming apparatus 101 of this embodiment includes the easily assembled driving unit 1 of the above embodiment, the image forming apparatus having a function of cleaning the transparent glass plates 25 covering the emission apertures 24a of the respective laser scanning units 21a to 21d can be easily manufactured.

Note that although both first and second helical gears 3, 4 are accommodated in the accommodating portions 7 of the holding members 5 in the above embodiment, the present invention is not limited to this and it is sufficient to accommodate at least the first helical gears 3 in the accommodating portions 7 of the holding members 5. Thus, the second helical gears 4 may be rotatably mounted outside the accommodating portions 7 in such a state as to be engageable with the first helical gears 3.

Although the second receiving portions 10 project inwardly from the inner peripheral surfaces of the shaft insertion holes 15 in the above embodiment, the present invention is not limited to this and the second receiving portions 10 may be formed to be flush with the inner peripheral surfaces of the shaft insertion holes 15. In this case as well, the second receiving portions 10 can receive the thrust force by coming into contact with the side surfaces 2c of the shaft 2.

Further, in the above embodiment, the thrust force F1 acting in the direction to push the first helical gears 3 to the backs of the accommodating portions 7 is received by the first receiving portions 9 having come into contact with the projections 12, 13 of the first helical gears 3 and, on the other hand, the thrust force F2 acting in the direction toward the openings 8 of the accommodating portions 7 opposite to the acting direction of the thrust force F1 is received by the second receiving portions 10 having come into contact with the side surfaces 2c of the shaft 2. However, the present invention is not limited to this. As a modification of the present invention, the first receiving portions 9 may receive the thrust force F1 acting toward the backs of the accommodating portion 7 by coming into contact with the side surfaces 2c of the shaft 2 and the second receiving portions 10 may receive the thrust force F2 acting toward the openings 8 by coming into contact with the projections 12, 13 of the first helical gears 3. In this case as well, even if the shaft 2 is rotated in both forward and reverse directions R1, R2, there is no problem that the first helical gears 3 move toward the openings 8 and the backs of the accommodating portions 7, and the first and second helical gears 3, 4 can be stably held at the predetermined positions.

Note that, besides the transparent glass plates 25 of the above embodiment, various materials having a laser transmission property can be adopted for the transmission members that cover the emission apertures 24a of the laser scanning units 21a to 21d and have the laser transmission property.

This application is based on Japanese Patent application No. 2010-244432 filed in Japan Patent Office on Oct. 29, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A driving unit, comprising:
a shaft;
a first helical gear coaxially connected to the shaft;
a second helical gear perpendicular to and engaged with the first helical gear;
a holding member for rotatably supporting the shaft and rotatably holding the first and second helical gears; and
a driver for driving and rotating the shaft in both a first rotational direction and a second rotational direction opposite to the first rotational direction,
wherein the holding member includes:
an accommodating portion which includes an opening used to insert the first helical gear and into which at least the first helical gear is inserted through the opening;
a shaft insertion hole which communicates with the accommodating portion and through which the shaft is inserted;
a first receiving portion for receiving a force, which is received from the second helical gear by the first helical gear and acting in a direction to push the first helical gear to the back of the accommodating portion, by coming into contact with the first helical gear or a part of the shaft when the shaft and the first helical gear are rotated in the first rotational direction; and
a second receiving portion provided on the inner peripheral surface of the shaft insertion hole or inside the shaft insertion hole for receiving a force, which is received from the second helical gear by the first helical gear and acting in a direction to push the first helical gear from the interior of the accommodating portion to the opening, by coming into contact with the first helical gear or a part of the shaft when the shaft and the first helical gear are rotated in the second rotational direction.

2. A driving unit according to claim 1, wherein:
the first helical gear includes a gear main body having teeth formed on the outer periphery, and a pair of projections provided on opposite side surfaces of the gear main body;
the first receiving portion comes into contact with the pair of projections;
each of the pair of projections has an arcuate first contact surface; and
the first receiving portion has arcuate second contact surfaces which respectively come into contact with the first contact surfaces.

3. A driving unit according to claim 1, wherein:
a side surface of the shaft has an arcuate third contact surface; and
the second receiving portion has an arcuate fourth contact surface which comes into contact with the third contact surface.

4. An image forming apparatus, comprising:
a laser scanning unit including a casing with an emission aperture for emitting a laser beam and a transmission member which covers the emission aperture and has a laser transmission property;
a driving unit according to claim 1;
a screw shaft coaxially connected to a second helical gear of the driving unit and having an external thread formed on the outer peripheral surface thereof; and
a wiping member including a tubular portion formed with an internal thread engaged with the external thread of the screw shaft, and a contact portion integrally coupled to the tubular portion and adapted to wipe off attached matters on a surface of the transmission member by moving in contact with the surface of the transmission member.

* * * * *